United States Patent
Park et al.

(10) Patent No.: US 8,373,689 B2
(45) Date of Patent: Feb. 12, 2013

(54) ORGANIC LIGHT EMITTING DIODE DISPLAY DEVICE

(75) Inventors: Hye-Min Park, Gyeongsangnam-do (KR); Kyoung-Don Woo, Gyeongbuk (KR); Hyun Lee, Gyeongbuk (KR); Sang-Woo Seo, Daegu (KR)

(73) Assignee: LG Display Co., Ltd., Seoul (KR)

( * ) Notice: Subject to any disclaimer, the term of this patent is extended or adjusted under 35 U.S.C. 154(b) by 430 days.

(21) Appl. No.: 12/647,847

(22) Filed: Dec. 28, 2009

(65) Prior Publication Data

US 2011/0001731 A1    Jan. 6, 2011

(30) Foreign Application Priority Data

Dec. 29, 2008    (KR) .................. 10-2008-0135313

(51) Int. Cl.
*G09G 5/00* (2006.01)
(52) U.S. Cl. ........................ 345/204; 323/282
(58) Field of Classification Search .................... None
See application file for complete search history.

(56) References Cited

U.S. PATENT DOCUMENTS

| | | | | |
|---|---|---|---|---|
| 5,734,204 | A * | 3/1998 | Sobue | 307/65 |
| 7,173,403 | B1 * | 2/2007 | Chen et al. | 323/282 |
| 7,495,397 | B2 * | 2/2009 | Okabe | 315/169.1 |
| 7,619,594 | B2 * | 11/2009 | Hu | 345/76 |
| 7,956,854 | B2 * | 6/2011 | Hashimoto | 345/204 |
| 2004/0130539 | A1 | 7/2004 | Yabu et al. | |
| 2005/0036078 | A1 | 2/2005 | Tsunashima et al. | |
| 2006/0071896 | A1 | 4/2006 | Nakata et al. | |
| 2007/0139301 | A1 | 6/2007 | Fryer | |

FOREIGN PATENT DOCUMENTS

| | | |
|---|---|---|
| CN | 1503209 A | 6/2004 |
| CN | 1576974 A | 2/2005 |
| CN | 2741314 Y | 11/2005 |
| CN | 1760720 A | 4/2006 |
| CN | 1867960 A | 11/2006 |

OTHER PUBLICATIONS

Office Action from the State Intellectual Property Office of the People's Republic of China (w/ English translation) dated Mar. 22, 2012 in Chinese counterpart application.

* cited by examiner

*Primary Examiner* — Jason Olson
(74) *Attorney, Agent, or Firm* — Morgan, Lewis & Bockius LLP (57) ABSTRACT

An organic light emitting diode display device capable of achieving a considerable reduction in power consumption by generating a drive signal only for a period, in which the drive signal is actually required, is disclosed. The organic light emitting diode display device includes a DC-DC converter including a switching element to generate a drive signal by controlling an input voltage under a control of a logic, and a driver to supply, to pixels, the drive signal generated from the DC-DC converter in accordance with a timing. The logic includes an AND circuit to AND a control signal for drive signal generation and an output control signal maintained at a logic-high voltage only for a period in which the drive signal is to be supplied, and to supply a result of the ANDing operation.

8 Claims, 6 Drawing Sheets

ORGANIC LIGHT EMITTING DIODE DISPLAY DEVICE

This application claims the benefit of the Korean Patent Application No. 10-2008-0135313, filed on Dec. 29, 2008 which is hereby incorporated by reference as if fully set forth herein.

BACKGROUND OF THE INVENTION

1. Field of the Invention

The present invention relates to an organic light emitting diode display device, and more particularly, to an organic light emitting diode display device capable of achieving a considerable reduction in power consumption by generating a drive signal only for a period in which the drive signal is actually required.

2. Discussion of the Related Art

Recently, various flat panel display devices having a reduced weight and a reduced volume, as compared to a cathode ray tube, have been developed. In particular, an organic light emitting diode display device is being highlighted because it exhibits excellence in terms of light emission efficiency, brightness, and viewing angle, and fast response time.

A light emitting element has a structure in which a thin film to emit light, namely, a light emitting layer, is interposed between a cathode electrode and an anode electrode. When electrons and holes injected into the light emitting layer are recombined, excitons are generated. As the excitons transit to a low energy state, it emits light.

The light emitting layer of such a light emitting element is made of an inorganic material or an organic material. In this regard, light emitting elements are classified into an inorganic light emitting element and an organic light emitting element.

An organic light emitting diode display device includes a DC-DC converter. The DC-DC converter generates signals required in the organic light emitting diode display device, through an operation of switching an input voltage supplied from the outside. In conventional cases, however, there is a problem in that power consumption is excessive because the signals are continuously output for one frame period.

SUMMARY OF THE INVENTION

Accordingly, the present invention is directed to an organic light emitting diode display device that substantially obviates one or more problems due to limitations and disadvantages of the related art.

An object of the present invention is to provide an organic light emitting diode display device capable of achieving a considerable reduction in power consumption by generating a drive signal only for a period in which the drive signal is actually required.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an organic light emitting diode display device comprises: a DC-DC converter comprising a switching element to generate a drive signal by controlling an input voltage under a control of a logic; and a driver to supply, to pixels, the drive signal generated from the DC-DC converter in accordance with a timing, wherein the logic comprises a logical operating unit to logically operate a control signal for drive signal generation and an output control signal maintained at a logic-high voltage only for a period in which the drive signal is to be supplied, and to supply a result of the logical operation.

Each of the pixels may comprise a pixel circuit to generate a drive current according to a data voltage from a data driver, using a first drive voltage from a first drive voltage source and a second drive voltage from a second drive voltage source, and a light emitting element to emit light, using the drive current from the pixel circuit.

The pixel circuit may comprise a signal transfer switching element to connect a data line and a node in accordance with a scan signal from a gate line, a drive switching element to control an amount of drive current supplied to the light emitting element in accordance with a signal state of the node, and a storage capacitor connected to the node and a source electrode of the drive switching element. A drain electrode of the drive switching element may be connected to a cathode electrode of the light emitting element. The first drive voltage source may be connected to an anode electrode of the light emitting element, and the second drive voltage source is connected to the source electrode of the drive switching element.

The drive signal may be one of the first drive voltage, the second drive voltage, a high voltage of the scan signal, a low voltage of the scan signal, and the data voltage.

The drive signal generation control signal and the output control signal may be varied depending on a kind of the drive signal.

The organic light emitting diode display device may further comprise a feedback circuit to generate a feedback voltage in accordance with an output from the DC-DC converter, and to supply the feedback voltage to the logic, an inductor connected between input and output terminals of the DC-DC converter, and a diode connected to the output terminal of the DC-DC converter such that the diode is connected to the inductor in parallel.

The feedback circuit may comprise a first resistor connected between an output terminal of the feedback circuit, from which the feedback voltage is output, and a cathode electrode of the diode, and a second resistor connected between the output terminal of the feedback circuit and the second drive voltage source.

The logical operating unit may be an AND circuit to AND the drive signal generation control signal and the output control signal, and to supply a result of the ANDing operation to the switching element.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
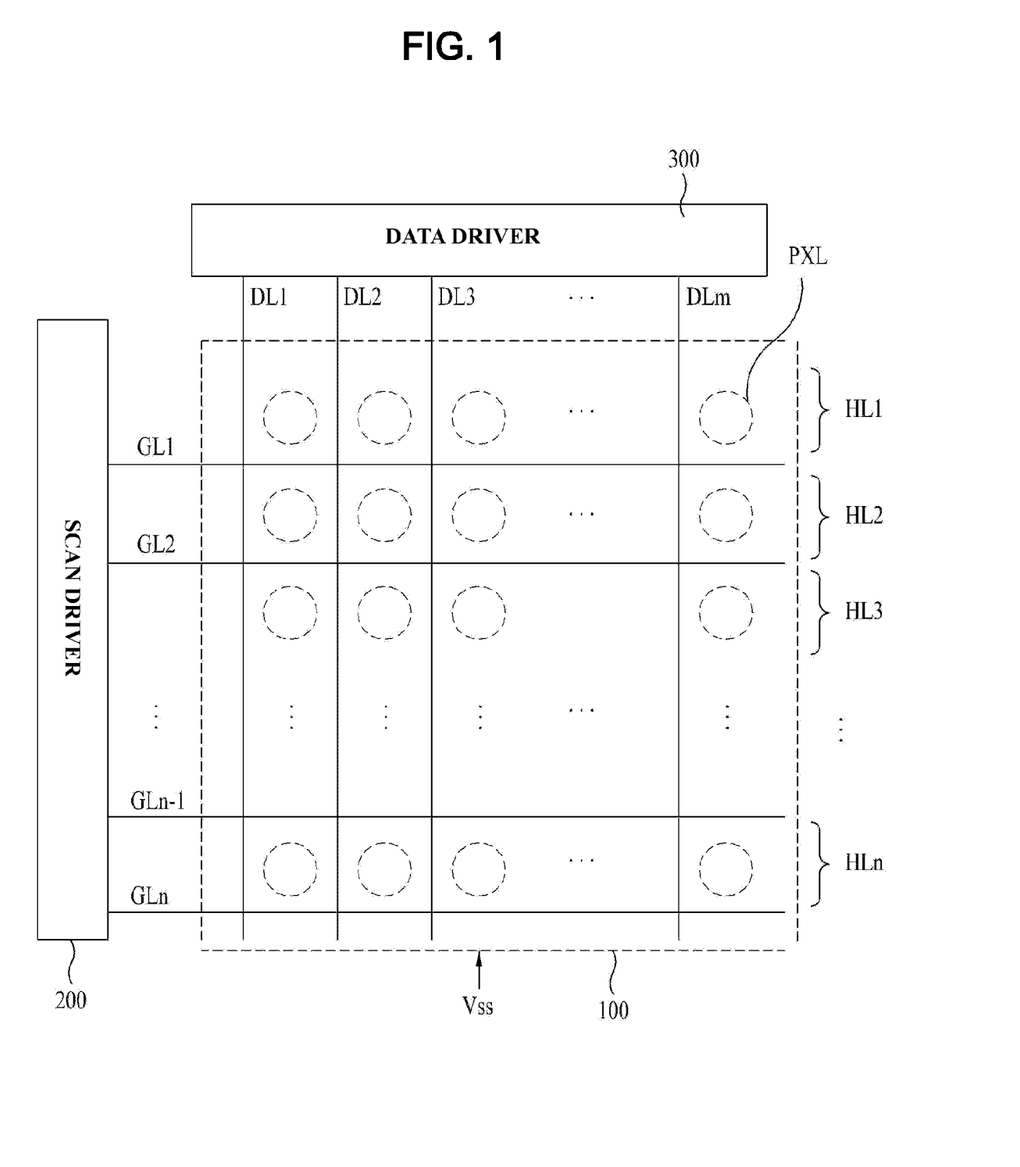
FIG. 1 is a view illustrating an organic light emitting diode display device according to an exemplary embodiment of the present invention.

FIG. 1 is a view illustrating an organic light emitting diode display device according to an exemplary embodiment of the present invention.

Referring to FIG. 1, the organic light emitting diode display device according to the illustrated embodiment of the present invention includes m ("m" is a natural number) data lines DL1 to DLm, to which a data signal is supplied, n ("n" is a natural number different from "m") gate lines GL1 to GLn, to which gate signals are supplied, respectively, a first drive voltage line (not shown), to which a first drive voltage VDD from a first drive voltage source is supplied, and a second drive voltage line (not shown), to which a second drive voltage VSS from a second drive voltage source is supplied. The organic light emitting diode display device further includes a gate driver 200 to drive the gate lines GL1 to GLn, and a data driver 300 to supply, to the data lines DL1 to DLm, a data voltage having information as to an image. The second drive voltage VSS is lower than the first drive voltage VDD. Where the first drive voltage VDD is a positive voltage, the second drive voltage VSS may be a negative voltage or a ground voltage. The first and second drive voltage lines are connected to all pixels PXL in common.

m pixels PXL in one horizontal line are connected to one gate line in common, while being connected to m data lines, respectively. For example, the first to m-th pixels PXL arranged along a first horizontal line are connected to the first gate line GL1 in common, while being connected to the first to m-th data lines DL1 to DLm, respectively. In other words, the first pixel PXL of the first horizontal line HL1 is connected to the first data line DL1, the second pixel PXL of the first horizontal line HL1 is connected to the second data line DL2, the third pixel PXL of the first horizontal line HL1 is connected to the third data line DL3, . . . , and the m-th pixel PXL of the first horizontal line HL1 is connected to the m-th data line DLm.

The gate driver 200 generates gate signals GS1 to GSn, using a start pulse and a clock signal, and sequentially supplies the generated gate signals GS1 to GSn to respective gate lines GL1 to GLn.

The data driver 300 generates a data voltage in accordance with data signals not shown, and supplies the data voltage to the data lines DL1 to DLm. In this case, the data driver 300 supplies a data voltage for one horizontal line to the data lines DL1 to DLm in every horizontal period. The data voltage may have a positive or negative polarity.

The data driver 300 receives digital image data from a timing controller, and converts the digital image data into a data voltage, which is an analog signal, using gamma reference voltages. That is, the data driver 300 divides the gamma reference voltages, to generate data voltages corresponding to respective gray levels, selects a data voltage corresponding to the gray level of input image data from the generated data voltages, and outputs the selected data voltage. The data driver 300 divides a gray level reference voltage supplied from a DC-DC converter, to generate the gamma reference voltages. Accordingly, the level of each gamma reference voltage depends on the level of the gray level reference voltage supplied from the DC-DC converter. Consequently, the level of the data voltage depends on the gray level reference voltage.

Figure 2:
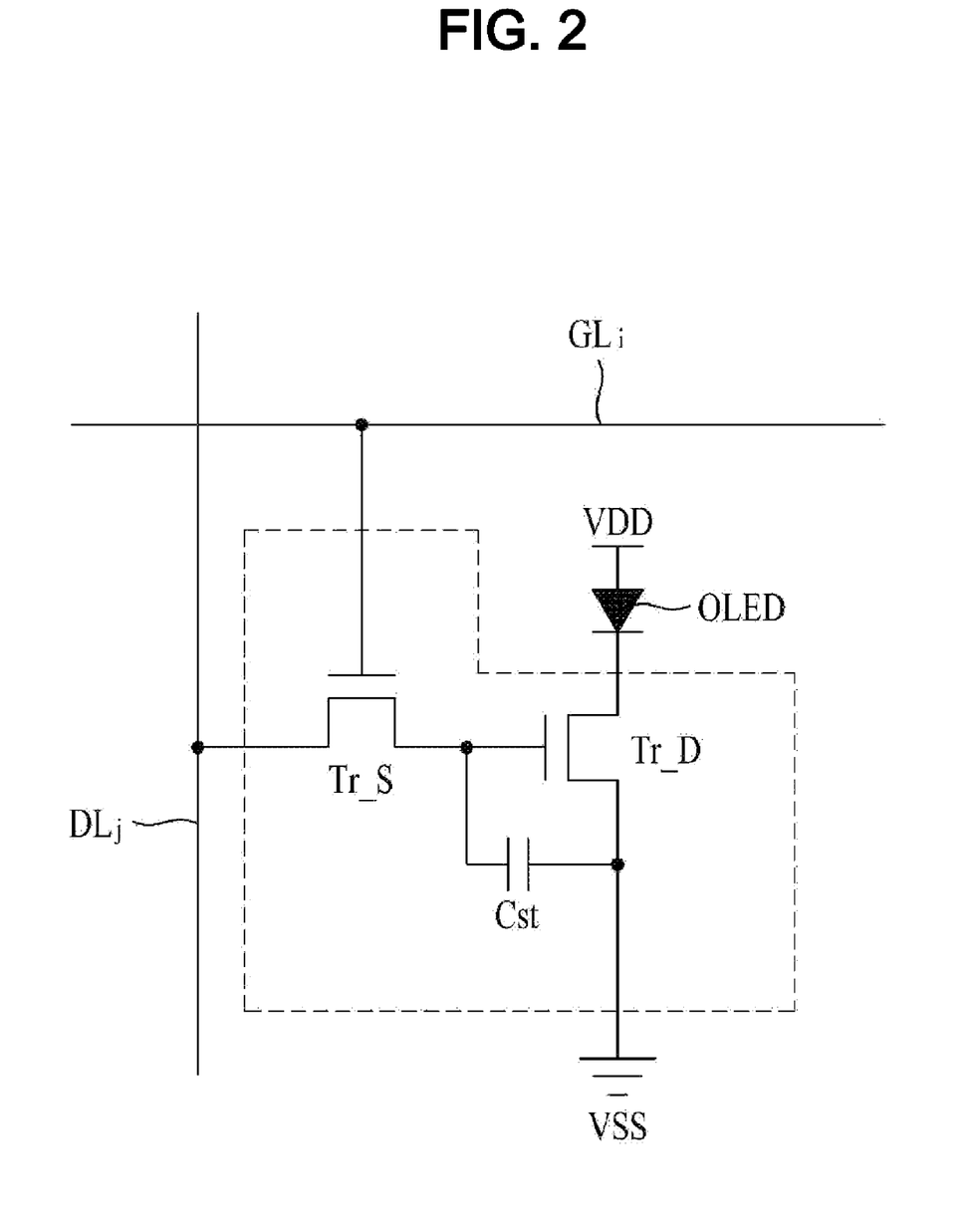
FIG. 2 is a circuit diagram illustrating a configuration of one pixel shown in FIG. 1.

FIG. 2 is a circuit diagram illustrating a configuration of one pixel shown in FIG. 1.

As shown in FIG. 2, the pixel includes a pixel circuit PD to generate a drive current according to a data voltage, from the data driver 200 using the first drive voltage VDD from the first drive voltage source and the second drive voltage VSS from the second drive voltage source, and a light emitting element OLED to emit light, using the drive current from the pixel circuit PD.

The pixel circuit PD includes a signal transfer switching element Tr_S, a drive switching element Tr_D, and a storage capacitor Cst.

The signal transfer switching element Tr_S connects, to a node n, a data line DLj ("j" is a natural number) receiving a data voltage from the data driver 300, in accordance with a scan signal from a gate line GLi ("i" is a natural number).

The drive switching element Tr_D controls the amount of the drive current supplied to the light emitting element OLED in accordance with a signal state of the node n.

The storage capacitor Cst is connected between the node n and a source electrode of the drive switching element Tr_D, to store the voltage of the node n for one frame period.

A drain electrode of the drive switching element Tr_D is connected to a cathode electrode of the light emitting element OLED. The first drive voltage is connected to an anode electrode of the light emitting element OLED.

The second drive voltage source is connected to the source electrode of the drive switching element Tr_D. Each of the signal transfer switching element Tr_S and drive switching element Tr_D is an N-type transistor using amorphous silicon (a-Si).

The drain and source electrodes of the drive switching element Tr_D may have reverse functions in accordance with the levels of voltages supplied thereto, respectively. For convenience of the description, however, the electrode of the drive switching element Tr_D, to which the first drive voltage VDD is supplied, will be referred to as a "drain electrode", and the electrode of the drive switching element Tr_D, to which the second drive voltage VSS is supplied, will be referred to as a "source electrode".

The signal transfer switching element Tr_S is turned on in accordance with the scan signal from the gate line GLi. In the ON state, the signal transfer switching element Tr_S supplies the data voltage from the data line DLj to the node n. Then, the node n is charged with the data voltage. As a result, the drive switching element Tr_D, which is connected, at the gate electrode thereof, to the node n, is turned on. As the drive switching element Tr_D is turned on, a drive current flowing from the first drive voltage source to the second drive voltage source is generated. The amount of the drive current depends on the level of the data voltage applied to the gate electrode of the drive switching element Tr_D. By this drive current, the light emitting element OLED emits light.

The first drive voltage VDD, the second drive voltage VSS, a high voltage of the scan signal, a low voltage of the scan signal, and the data voltage function as drive signals. These drive signals are supplied from the DC-DC converter. Hereinafter, the DC-DC converter will be described in more detail.

Figure 3:
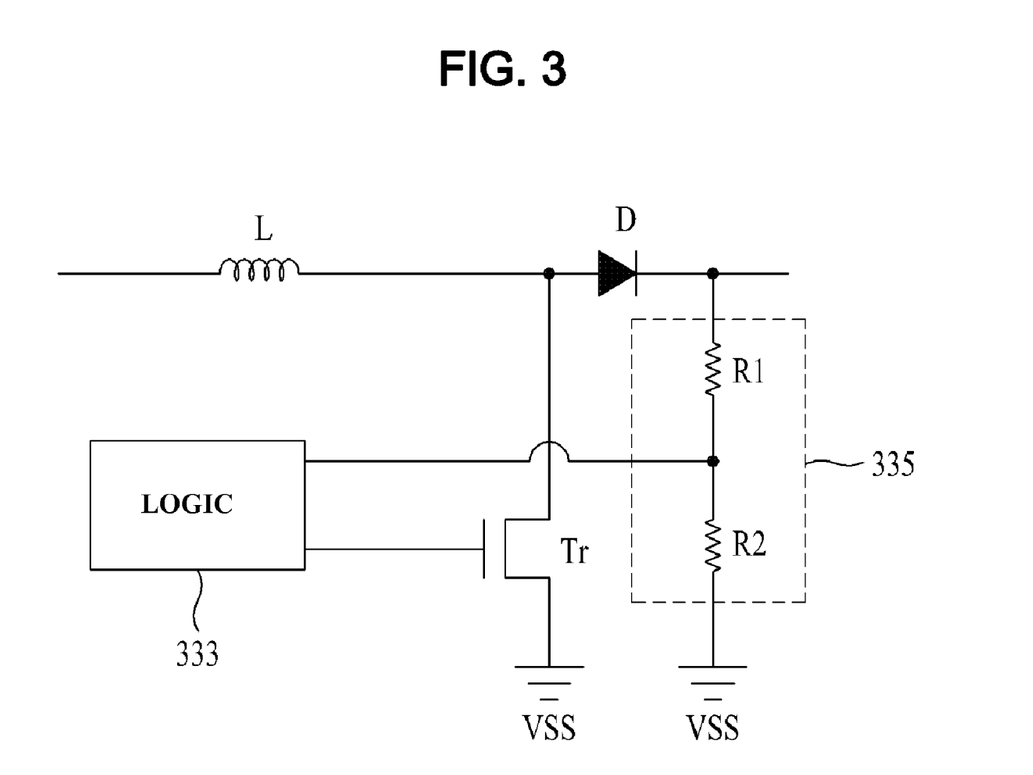
FIG. 3 is a circuit diagram illustrating a detailed configuration of the DC-DC converter according to an exemplary embodiment of the present invention.

FIG. 3 is a circuit diagram illustrating a detailed configuration of the DC-DC converter according to an exemplary embodiment of the present invention.

As shown in FIG. 3, the DC-DC converter according to the illustrated embodiment of the present invention includes a switching element Tr to generate a drive signal by controlling an input voltage under the control of a logic 333. The configuration of the logic 333 will be described hereinafter.

Figure 4:
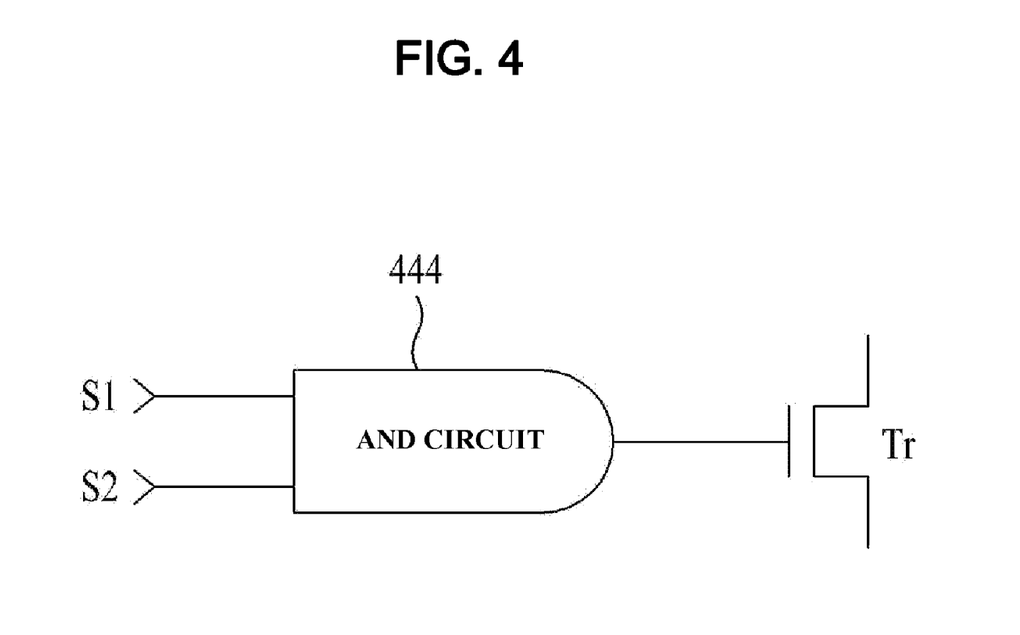
FIG. 4 is a circuit diagram illustrating an AND circuit included in a logic of FIG. 3.
Figure 5:
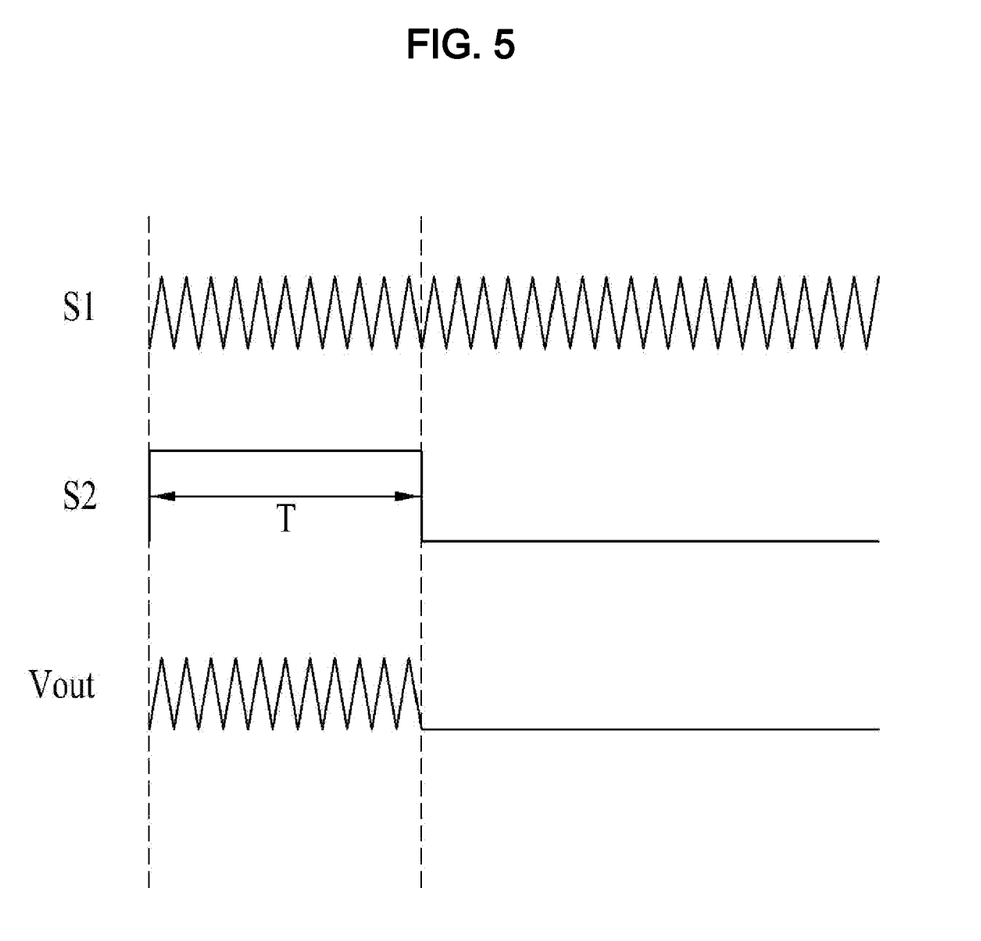
FIG. 5 is a waveform diagram illustrating input and output signals of the AND circuit.

FIG. 4 is a circuit diagram illustrating an AND circuit 444 included in the logic 333 of FIG. 3. FIG. 5 is a waveform diagram illustrating input and output signals of the AND circuit 444.

As shown in FIG. 4, the logic 333 includes the AND circuit 444. The AND circuit 444 has a first input terminal, to which a control signal S1 for generation of a drive signal is supplied, and a second input terminal, to which an output control signal S2 is supplied. The drive signal generation control signal S1 is a signal required for generation of the above-described drive signals. As shown in FIG. 5, the drive signal generation control signal S1 has a logic-high voltage and a logic-low voltage, which alternate repeatedly for one frame period. The output control signal S2 has a logic-high voltage only for a drive period T of one frame period, while being maintained at a logic-low voltage for the remaining period.

The AND circuit 444 receives the drive signal generation control signal S1 and output control signal S2, and ANDs the signals S1 and S2. The output Vout from the AND circuit 444 has a waveform that alternating logic-high and logic-low voltages are repeatedly generated only for the drive period T. That is, although the drive signal generation control signal S1 input to the AND circuit 44 has a waveform that alternating logic-high and logic-low voltages are continuously and repeatedly generated for one frame period, irrespective of the drive period T, the output Vout generated when the drive signal generation control signal S1 passes through the AND circuit 444 has a waveform that alternating logic-high and logic-low voltages are repeatedly generated only for the drive period T set by the output control signal S2, and a logic-low voltage is maintained for the remaining period. The output Vout from the AND circuit 4444 is supplied to the gate electrode of the switching element Tr. Then, the switching element Tr is repeatedly turned on and off for the drive period T. For the remaining period except for the drive period T, the switching element Tr is maintained in an OFF state. In accordance with this operation of the switching element Tr, a drive signal is output from the DC-DC converter. In this case, the drive signal is selectively output only for the above-described drive period T, and is not outputted for the remaining period.

Here, the drive period T means a period, in which a drive signal to be supplied to the pixel is actually required. The drive period T depends on the kind of the drive signal. For example, where the drive signal is the high voltage of the scan signal, the drive period T corresponds to a non-emission period taking about 20% of one frame period. Thus, it is possible to considerably reduce the power consumption of the DC-DC converter by generating a drive signal only for a portion of one frame period, in which the drive signal is actually required, in accordance with the present invention.

As described above, the drive signal may be one of the first drive voltage VDD, the second drive voltage VSS, the high voltage of the scan signal, the low voltage of the scan signal, and the data voltage. The characteristics of the drive signal generation control signal S1 and output control signal S2 are varied in accordance with the kind of the drive signal.

Meanwhile, the organic light emitting diode display device according to the illustrated embodiment of the present invention further includes a feedback circuit 335 to generate a feedback voltage in accordance with an output from the DC-DC converter, and to supply the feedback voltage to the logic 333 of the DC-DC converter, an inductor L connected between the input and output terminals of the DC-DC converter, and a Zener diode D connected to the output terminal of the DC-DC converter such that the Zener diode D is connected to the inductor L in parallel.

The feedback circuit 335 includes a first resistor R1 connected between an output terminal of the feedback circuit 335, from which the feedback voltage is output, and a cathode electrode of the Zener diode D, and a second resistor R2 connected between the output terminal of the feedback circuit 335 and the second drive voltage source.

Figure 6:
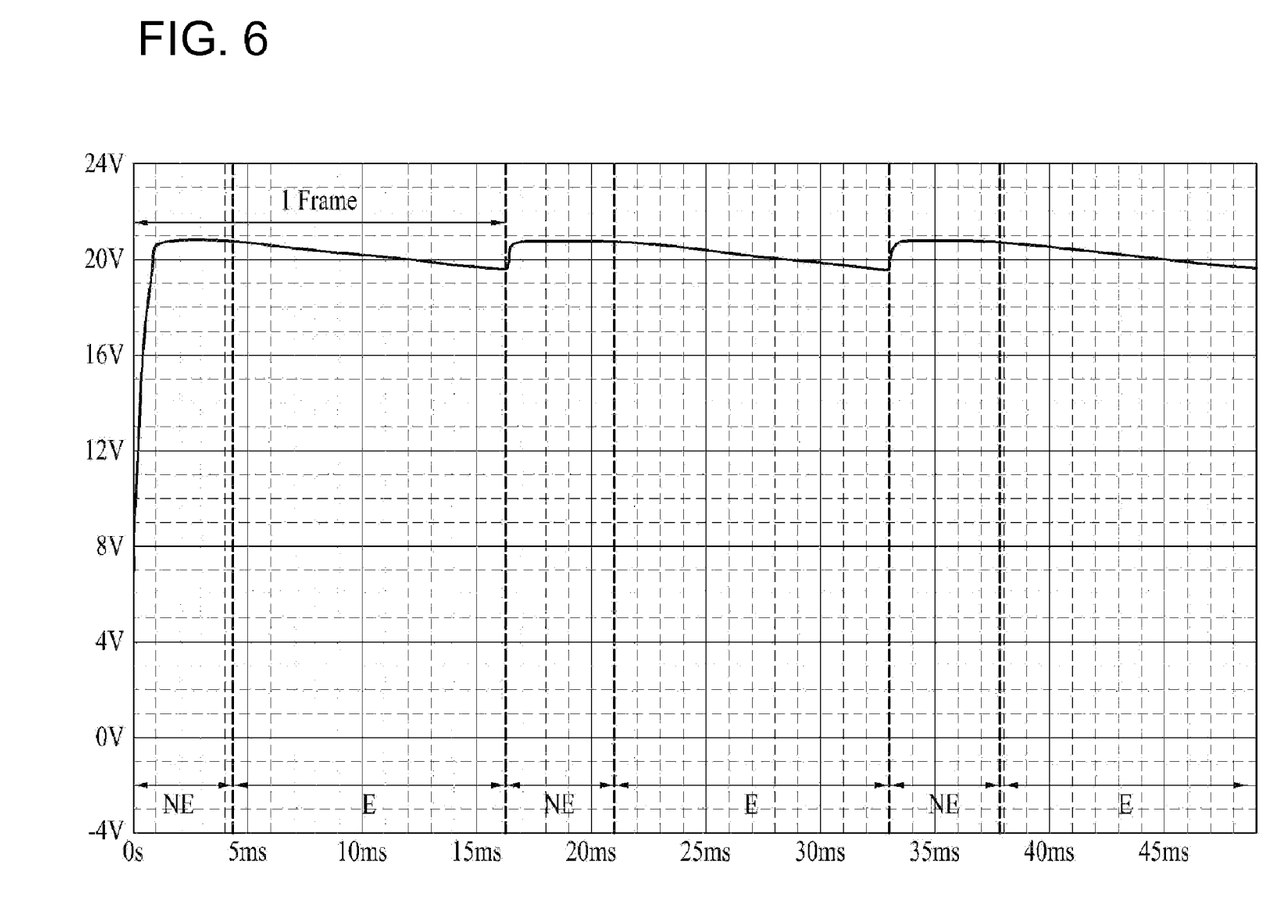
FIG. 6 is a waveform diagram illustrating a waveform of a high voltage of a scan signal output from the DC-DC converter.

FIG. 6 is a waveform diagram illustrating a waveform of the high voltage of the scan signal output from the DC-DC converter. Referring to FIG. 6, it can be seen that the high voltage of the scan signal generated for an emission period E of one frame period is lower than the high voltage of the scan signal generated for a non-emission period NE of one frame period. That is, the high voltage of the scan signal is output in the non-emission period NE corresponding to the drive period T, and is not output in the emission period E.

As apparent from the above description, the organic light emitting diode display device according to the present invention provides various effects.

For example, in accordance with the present invention, it is possible to achieve a considerable reduction in power consumption by generating a drive signal only for a period in which the drive signal is actually required.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An organic light emitting diode display device comprising:
 a DC-DC converter comprising a switching element to generate a drive signal by controlling an input voltage under a control of a logic; and
 a driver to supply, to pixels, the drive signal generated from the DC-DC converter in accordance with a timing,
 wherein the logic comprises a logical operating unit to logically operate a control signal for drive signal generation and an output control signal maintained at a logic-high voltage only for a period in which the drive signal to be supplied to the pixels is actually required, and to supply a result of the logical operation.

2. The organic light emitting diode display device according to claim 1, wherein each of the pixels comprises:
 a pixel circuit to generate a drive current according to a data voltage from a data driver, using a first drive voltage from a first drive voltage source and a second drive voltage from a second drive voltage source; and
 a light emitting element to emit light, using the drive current from the pixel circuit.

3. The organic light emitting diode display device according to claim 2, wherein:
the pixel circuit comprises:
a signal transfer switching element to connect a data line and a node in accordance with a scan signal from a gate line,
a drive switching element to control an amount of drive current supplied to the light emitting element in accordance with a signal state of the node, and
a storage capacitor connected to the node and a source electrode of the drive switching element;
a drain electrode of the drive switching element is connected to a cathode electrode of the light emitting element; and
the first drive voltage source is connected to an anode electrode of the light emitting element, and the second drive voltage source is connected to the source electrode of the drive switching element.

4. The organic light emitting diode display device according to claim 3, wherein the drive signal is one of the first drive voltage, the second drive voltage, a high voltage of the scan signal, a low voltage of the scan signal, and the data voltage.

5. The organic light emitting diode display device according to claim 4, wherein the drive signal generation control signal and the output control signal are varied depending on a kind of the drive signal.

6. The organic light emitting diode display device according to claim 1, further comprising:
a feedback circuit to generate a feedback voltage in accordance with an output from the DC-DC converter, and to supply the feedback voltage to the logic;
an inductor connected between input and output terminals of the DC-DC converter; and
a diode connected to the output terminal of the DC-DC converter such that the diode is connected to the inductor in parallel.

7. The organic light emitting diode display device according to claim 6, wherein the feedback circuit comprises:
a first resistor connected between an output terminal of the feedback circuit, from which the feedback voltage is output, and a cathode electrode of the diode; and
a second resistor connected between the output terminal of the feedback circuit and a drive voltage source.

8. The organic light emitting diode display device according to claim 1, wherein the logical operating unit is an AND circuit to AND the drive signal generation control signal and the output control signal, and to supply a result of the ANDing operation to the switching element.

* * * * *